(12) United States Patent
Segall

(10) Patent No.: US 8,175,158 B2
(45) Date of Patent: May 8, 2012

(54) METHODS AND SYSTEMS FOR INTER-LAYER IMAGE PREDICTION PARAMETER DETERMINATION

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1130 days.

(21) Appl. No.: 11/969,719

(22) Filed: Jan. 4, 2008

(65) Prior Publication Data

US 2009/0175338 A1 Jul. 9, 2009

(51) Int. Cl.
*H04N 11/04* (2006.01)
(52) U.S. Cl. .................................. 375/240.14
(58) Field of Classification Search .................. 375/240, 375/240.12, 240.13, 240.14, 240.15, 240.2, 375/240.25, 240.29; 382/238
See application file for complete search history.

(56) References Cited

U.S. PATENT DOCUMENTS

| | | | |
|---|---|---|---|
| 5,832,120 A | 11/1998 | Prabhakar et al. | |
| 6,396,422 B1 | 5/2002 | Barkan | |
| 6,400,996 B1 | 6/2002 | Hoffberg et al. | |
| 6,829,301 B1 | 12/2004 | Tinker et al. | |
| 6,850,252 B1 | 2/2005 | Hoffberg | |
| 6,867,717 B1 | 3/2005 | Ion et al. | |
| 7,006,881 B1 | 2/2006 | Hoffberg et al. | |
| 2003/0112863 A1 | 6/2003 | Demos | |
| 2004/0141615 A1 | 7/2004 | Chujoh et al. | |
| 2006/0002611 A1 | 1/2006 | Mantiuk et al. | |
| 2006/0104533 A1 | 5/2006 | Daly et al. | |
| 2006/0126962 A1 | 6/2006 | Sun | |
| 2006/0200253 A1 | 9/2006 | Hoffberg et al. | |
| 2006/0200258 A1 | 9/2006 | Hoffberg et al. | |
| 2006/0200259 A1 | 9/2006 | Hoffberg et al. | |
| 2006/0200260 A1 | 9/2006 | Hoffberg et al. | |
| 2006/0209959 A1 | 9/2006 | Sun | |
| 2006/0210185 A1 | 9/2006 | Sun | |
| 2006/0251330 A1 | 11/2006 | Toth et al. | |
| 2007/0140354 A1 | 6/2007 | Sun | |
| 2007/0201560 A1 | 8/2007 | Segall et al. | |
| 2007/0269104 A1* | 11/2007 | Whitehead et al. | 382/162 |
| 2009/0003457 A1* | 1/2009 | Liu et al. | 375/240.25 |
| 2009/0097558 A1* | 4/2009 | Ye et al. | 375/240.13 |

FOREIGN PATENT DOCUMENTS

| | | | |
|---|---|---|---|
| EP | 1871113 | * | 12/2007 |
| JP | 2006-279383 A | | 10/2006 |
| WO | 2005/104035 A1 | | 11/2005 |
| WO | 2007/082562 A2 | | 7/2007 |

OTHER PUBLICATIONS

Su et al, System for Bit-Depth Scalability Coding, Joint Video Team (JVT) of ISO/IEC MPEG & ITU-T VCEG, 4 pages, 2007.*
Liu et al, Inter-layer Prediction for SVC Bit-Depth Scalability, Joint Video Team (JVT) of ISO/IEC MPEG & ITU-T VCEG, 9 pages, 2007.*
Winken et al, Bit-Depth Scalable Video Coding, IEEE, 4 pages, 2007.*

(Continued)

*Primary Examiner* — Frank Duong
(74) *Attorney, Agent, or Firm* — Kristine Elizabeth Matthews; David C. Ripma

(57) ABSTRACT

Aspects of the present invention are related to systems and methods for predicting a prediction parameter which may be used in the prediction of high dynamic range image elements from low dynamic range image data.

21 Claims, 11 Drawing Sheets

OTHER PUBLICATIONS

R. Mantiuk, A. Efremov, K. Myszkowski and H.-P. Seidel, "Backward Compatible High Dynamic Range MPEG Video Compression," ACM Transactions of Graphics (TOG)—Proceedings of ACM SIGGRAPH 2006, Jul. 2006, pp. 713-723, vol. 25, Issue 3, ACM Press, USA.

R. Mantiuk, G. Krawczyk, K. Myszkowski and H.-P. Seidel, "Perception-motivated High Dynamic Range Video Encoding," ACM Transactions on Graphics (TOG) (Special Issue: Proceedings of SIGGRAPH '04), Aug. 2004, pp. 733-741, vol. 23, No. 3, ACM Press, USA.

H. Seetzen, W. Heidrich, W. Stuerzlinger, G. Ward, L. Whitehead, M. Trentacoste, A. Ghosh and A. Vorozcovs, "High Dynamic Range Display Systems," ACM Transactions on Graphics (TOG) (Special Issue: Proceedings of SIGGRAPH '04), Aug. 2004, pp. 760-768, vol. 23, No. 3, ACM Press, USA.

H. Seetzen, L. Whitehead and G. Ward, "A High Dynamic Range Display Using Low and High Resolution Modulators," The Society for Information Display International Symposium, Baltimore, Maryland, May 2003.

G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.

Y Li, L. Sharan and E. Adelson, "Compressing and Companding High Dynamic Range Images with Subband Architectures," ACM Transactions on Graphics (TOG) (Proceedings of SIGGRAPH '05), Jul. 2005, pp. 836-844, vol. 24, Issue 3, ACM Press, USA.

Andrew Segall and Yeping Su, "CE1: Inter-layer Prediction for Bit-Depth Scalable Coding," Joint Video Team (JVT) of ISO/IEC MPEG & ITU-T VCEG (ISO/IEC JTC1/SC29/VVG11 and ITU-T SG16 Q.6) 25th Meeting: Shenzhen, China, Oct. 21-26, 2007—Document: JVT-X071—Filename: JVT-Y071.doc.

Andrew Segall, "Scalable Coding of High Dynamic Range Video," IEEE International Conference on Image Processing, 2007, ICIP 2007, Sep. 16, 2007, pp. I-1- I-4, vol. 1.

International Application No. PCT/JP2008/073966 International Search Report—Mailing Date Apr. 21, 2009.

Brightside Technologies, Inc., "DR37-P: Detailed Preliminary Specifications—V2.0," http://www.brightsidetech.com/products/info/dr37p_specs.pdf, 2005 This site is no longer available—see instead—http://web.archive.org/web/*/http:/www.brightsidetech.com/products/info/dr37p_specs.pdf, Sep. 26, 2005 entry—accessed on Jul. 29, 2008.

Japanese Office Action—Patent Application No. 2007-044489—Mailing Date Mar. 23, 2010.

* cited by examiner

METHODS AND SYSTEMS FOR INTER-LAYER IMAGE PREDICTION PARAMETER DETERMINATION

FIELD OF THE INVENTION

Embodiments of the present invention comprise methods and systems for inter-layer image prediction.

SUMMARY

Some embodiments of the present invention comprise methods and systems for prediction of images comprising multiple dynamic range layers. Some embodiments of the present invention comprise methods and systems for determining a high dynamic range (HDR) prediction parameter which may be used to predict HDR image data from low dynamic range (LDR) image data. In some embodiments of the present invention, an HDR prediction parameter may be predicted based on analysis of decoded LDR image data. In some embodiments of the present invention, an HDR prediction parameter may be predicted from the HDR prediction parameters corresponding to previously transmitted image frames.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 17:
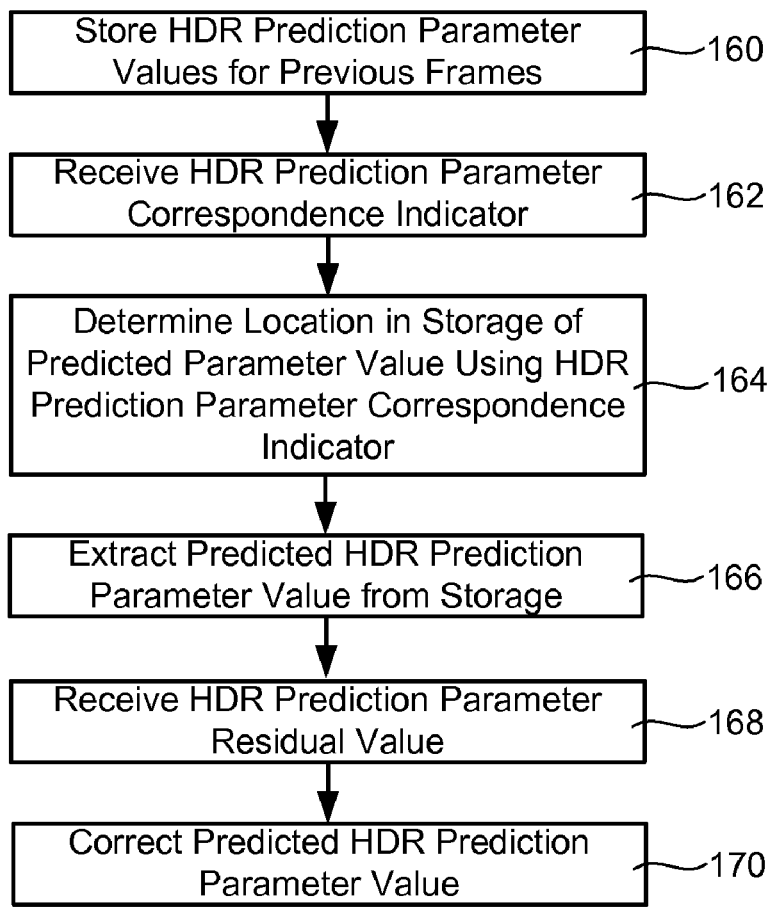
Figure 18:
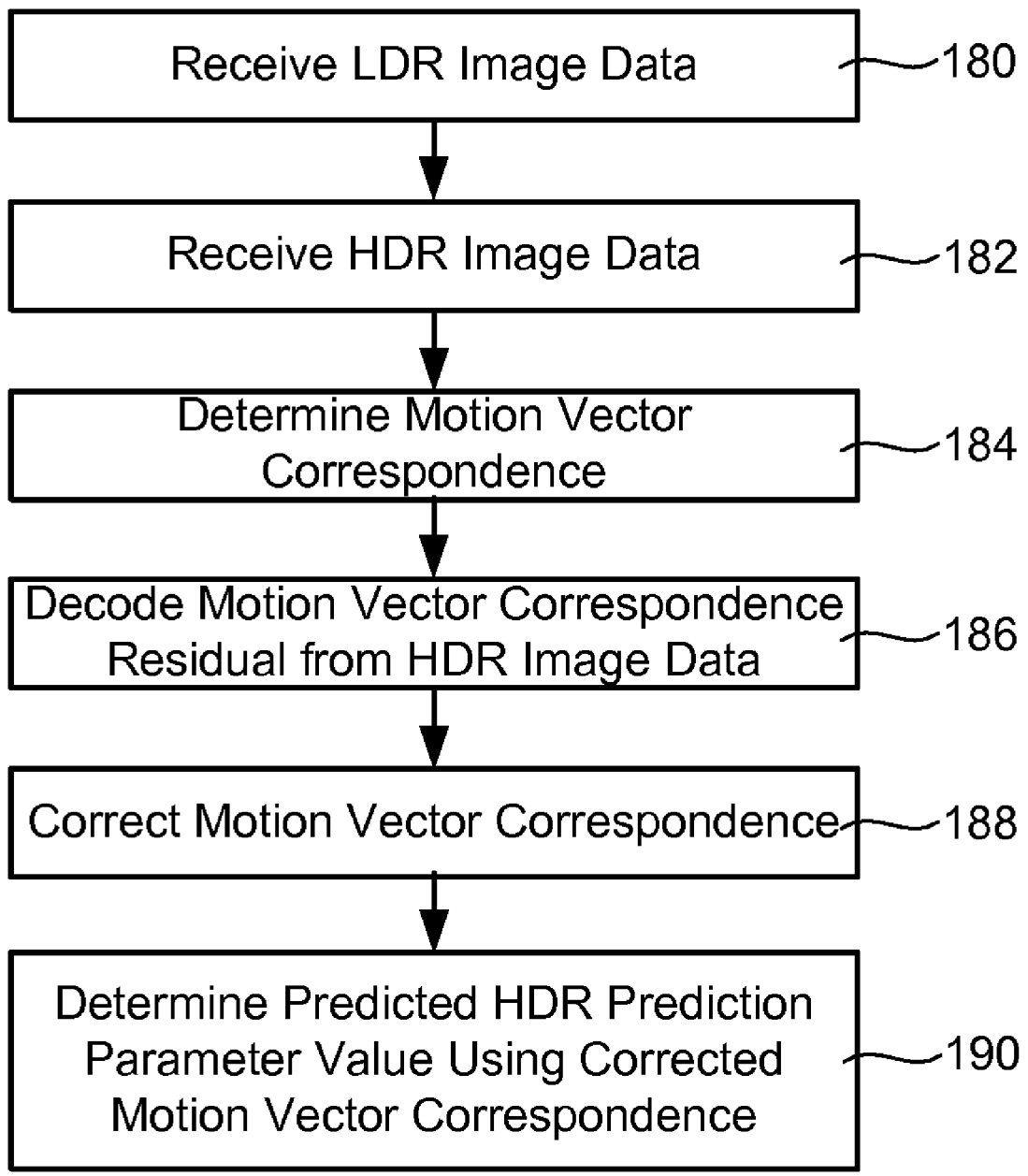

FIG. 17 is a chart showing an exemplary embodiment of the present invention comprising correcting a predicted HDR prediction parameter value in accordance with a residual value received as part of an HDR enhancement-layer bitstream; and FIG. 18 is a chart showing an exemplary embodiment of the present invention comprising correcting a motion vector correspondence value in accordance with a residual value received as part of an HDR enhancement-layer bitstream.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise systems and methods for using a low dynamic range (LDR) video sequence to predict a high dynamic range (HDR) version of the image data. This may be referred to as inter-layer prediction in this application. Some embodiments of the present invention comprise a spatially-varying inter-layer prediction mechanism for HDR video coding. Some embodiments of the present invention comprise an inter-layer prediction mechanism for HDR video coding that operates in the color spaces used for video compression and transmission. Some embodiments use gamma-corrected color spaces. Exemplary embodiments may use xvYCC and YCbCr color spaces. Some embodiments of the present invention comprise an inter-layer prediction mechanism for HDR video coding that may be disabled spatially. Some embodiments of the present invention comprise an inter-layer prediction mechanism for HDR video coding that is multiplication free. Some embodiments of the present invention comprise an inter-layer prediction mechanism for HDR video coding that may be used in a single-loop decoder. Some embodiments may also be incorporated into multi-loop designs.

Some embodiments of the present invention comprise an inter-layer prediction technique for high-dynamic range video coding. Some aspects of some embodiments comprise elements described in U.S. patent application Ser. No. 11/362,571, filed on Feb. 24, 2006, which is hereby incorporated herein by reference. Some embodiments of the present invention comprise a method for projecting decoded low dynamic range data to the high dynamic range coding space. This process may be referred to as inter-layer prediction.

An analogous process to inter-layer prediction for high dynamic range video coding is inter-layer prediction for bit-depth scalability. For bit-depth scalability, the base layer of a video bitstream may contain a representation of the video sequence at a reduced bit-depth. For example, the base layer may contain an eight-bit representation of the sequence, while the enhancement layer of the bitstream may contain a ten-bit representation. In some scenarios, more than two layers may be used. In some scenarios, an eight-bit version may represent the eight most significant bits of the higher bit-depth sequence. The higher bit-depth version may therefore be predicted by multiplying (or equivalently scaling) the decoded lower bit-depth data to the higher bit-depth. In this specific example, the eight-bit data may be decoded and subsequently scaled by a factor of four to predict the ten-bit data. This scaling may be done in either the intensity or transform domain, depending on the application.

High dynamic range video coding may be considered a more general case of bit-depth scalability. The base layer and enhancement layer may contain data represented with different bit-depths. However, the base layer may not be constrained to represent the most significant bits of the enhancement-layer data. In some embodiments of the present invention, the base-layer data may contain a lower bit-depth representation of the high dynamic range sequence, and this lower bit-depth may not always correspond to the most significant bits of the corresponding higher bit-depth representation.

Figure 1A:
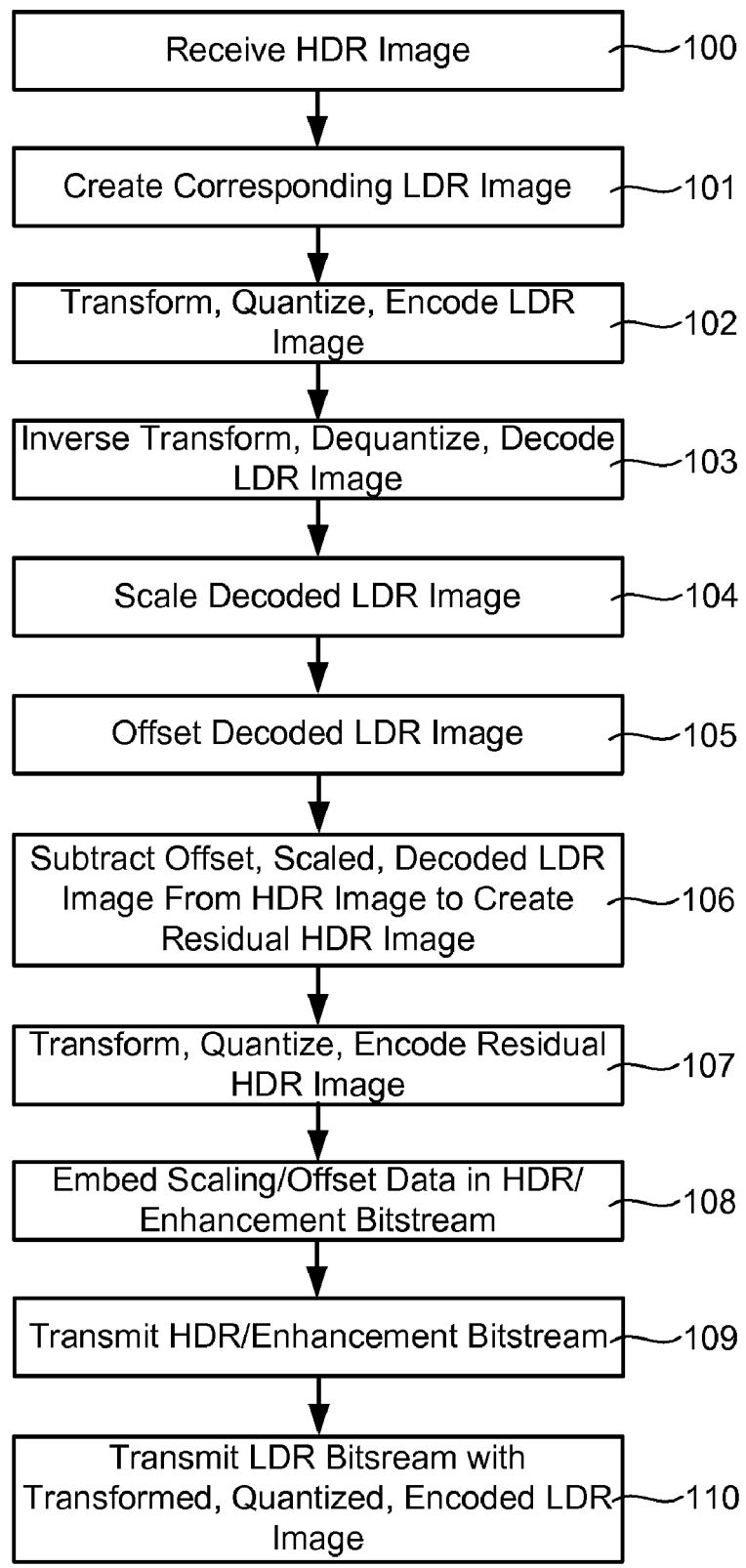
FIG. 1A is a chart showing an exemplary embodiment of the present invention comprising prediction with a scaled and offset LDR image element.

Some embodiments of the present invention may be described with reference to FIG. 1A. In these embodiments, a high dynamic range (HDR) image may be received 100. A corresponding low dynamic range (LDR) image may also be received, or, alternatively, created 101 from the HDR image. The LDR image may be created 101 through a tone-scale operation, a conversion function or some other method. The LDR image may then be predicted, transformed, quantized and encoded 102, as is well known in the art. In a few exemplary embodiments, the LDR image may be transformed using a discrete cosine transform (DCT), a wavelet transform or by other common transformation methods. The prediction, transformation, quantization and encoding processes may then be substantially reversed 103 to provide a decoded LDR image as would be decoded at a typical decoder. Typically, a de-quantization process is lossy and therefore does not produce an exact copy of the originally encoded image. Other processes may also affect the reproduction of the original LDR image. Regardless, the decoded LDR image may be processed by one or more of the following methods: color conversion, scaling 104 and offsetting 105. The decoded, processed LDR image may now be used to create 106 a residual HDR image. This may be performed by subtracting the decoded, processed LDR image from the original HDR image. Other methods may also be used.

The residual HDR image may then be transformed, quantized and encoded 107, or otherwise prepared, for transmission to a destination. In some embodiments, this step may comprise embedding the encoded residual HDR image into an HDR, or enhancement-layer, bitstream. Information related to the color conversion, scaling and offset operations may also be encoded and embedded 108 in the HDR, or enhancement-layer, bitstream. The HDR/enhancement-layer bitstream may then be transmitted 109 to a destination. An LDR/base-layer bitstream may also be transmitted 110 to the destination. In some embodiments, the LDR/base-layer bitstream may also comprise a transformed, quantized and encoded LDR image.

A decoder receiving the LDR/base-layer bitstream may then decode the LDR/base-layer image. A decoder receiving the LDR/base-layer bitstream and the HDR/enhancement-layer bitstream may decode both the LDR/base-layer image and the HDR/enhancement-layer image. Embodiments of the present invention comprise methods and systems for encoding and decoding images in this framework and similar scenarios.

Figure 1B:
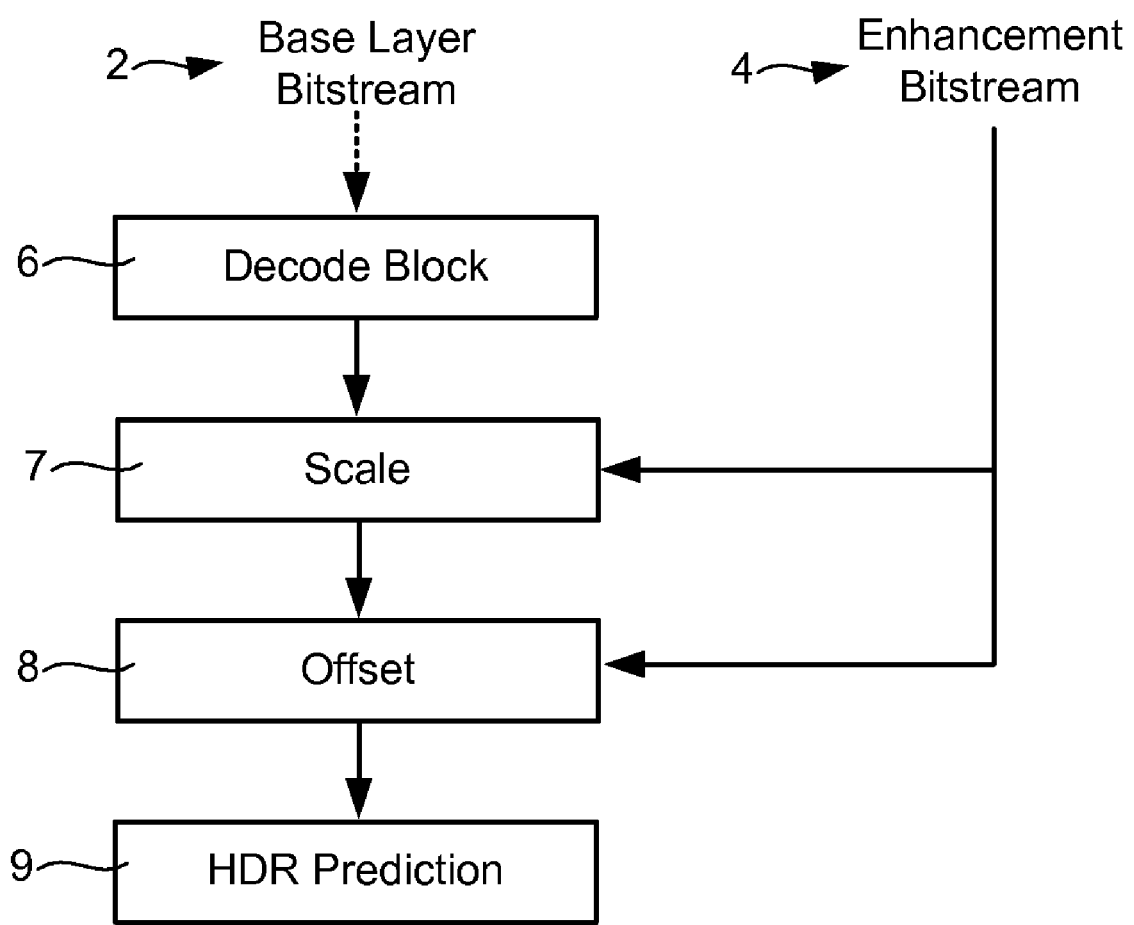
FIG. 1B is a chart showing an exemplary embodiment of the present invention comprising scaling and offsetting decoded image elements for HDR prediction.

Some embodiments of the present invention may be described with reference to FIG. 1B. In these embodiments, a base-layer decoder may receive base-layer data, such as from a base-layer bitstream 2. The base-layer decoder may decode 6 a base-layer block, or other image element, and represent it in the spatial domain. Some embodiments may comprise full decoding of the block, including a prediction process followed by residual refinement. Some embodiments may comprise reconstruction of the residual only. In some embodiments, the spatial information in the base layer may be used to predict the high dynamic range signal. Some embodiments may comprise scaling 7 the base-layer information. Some embodiments may also comprise adding an offset 8 to the base-layer information. Some embodiments may comprise both scaling 7 and adding an offset 8. Once scaling 7 and/or adding an offset 8 are performed on the decoded base-layer information, that scaled, offset information may be used to predict 9 an enhancement layer, such as a higher dynamic range (HDR) layer. In some embodiments, scaling 7 and offset 8 data may be extracted from an enhancement-layer bitstream 4. In some embodiments, subsequent refinement may be decoded from the enhancement-layer bitstream 4.

Figure 2:
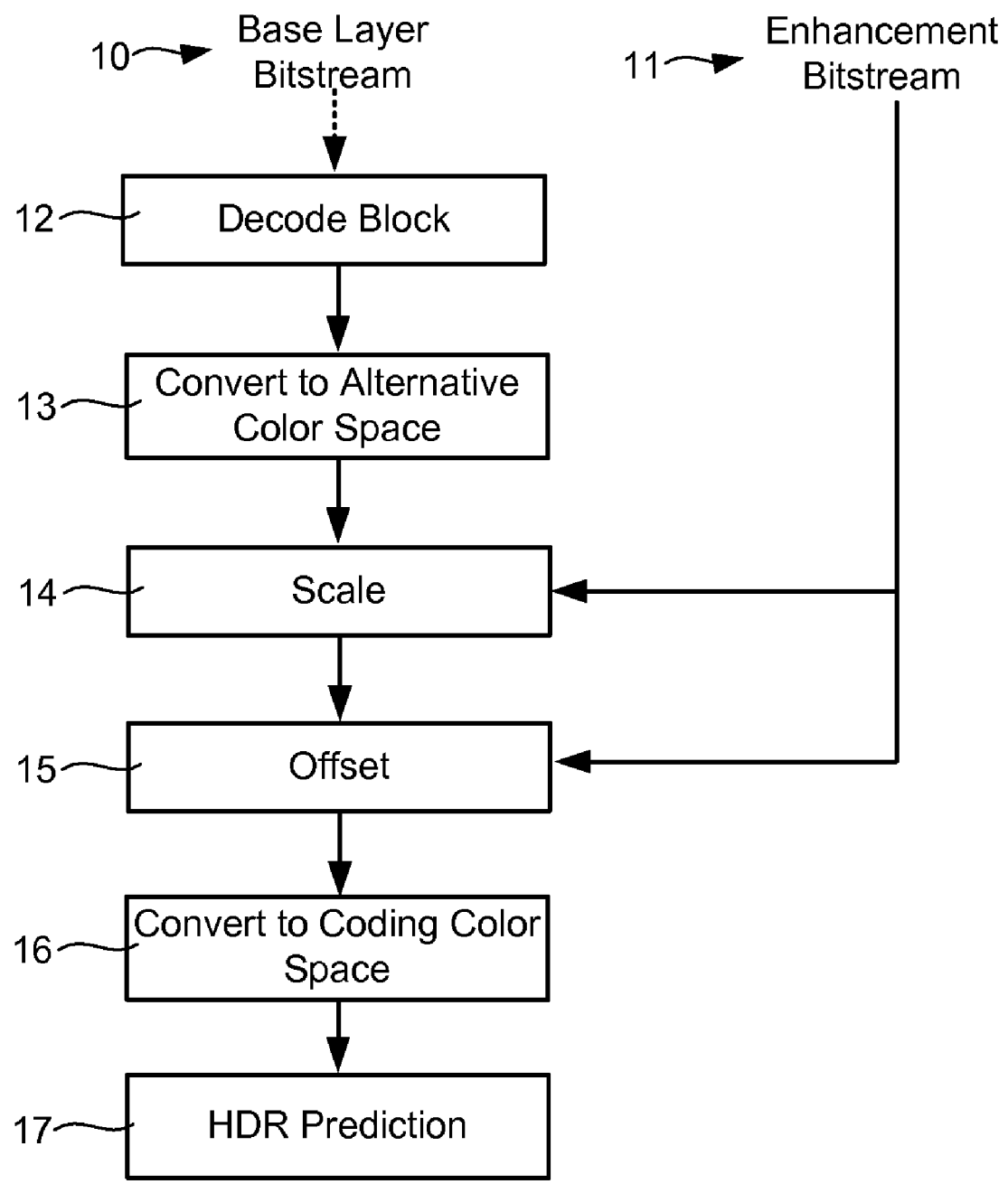
FIG. 2 is a chart showing an exemplary embodiment of the present invention comprising conversion to an alternative color space.

Some embodiments of the present invention may be described with reference to FIG. 2. In these embodiments, a decoder may receive base-layer data 10 from which a block, or other image element, may be decoded 12 into spatial image data. This spatial image data may then be converted 13 to an alternative color space. This converted data may then be scaled 14 and/or offset 15. Scaling and offset operations may be performed according to instructions and/or data received from an enhancement bitstream 11. This converted, scaled and/or offset data may then be converted 16 back to the coding color space. Once converted back to the coding color space, the scaled and/or offset data may be used to predict 17 an enhancement layer, such as a higher dynamic range (HDR) layer.

Figure 3:
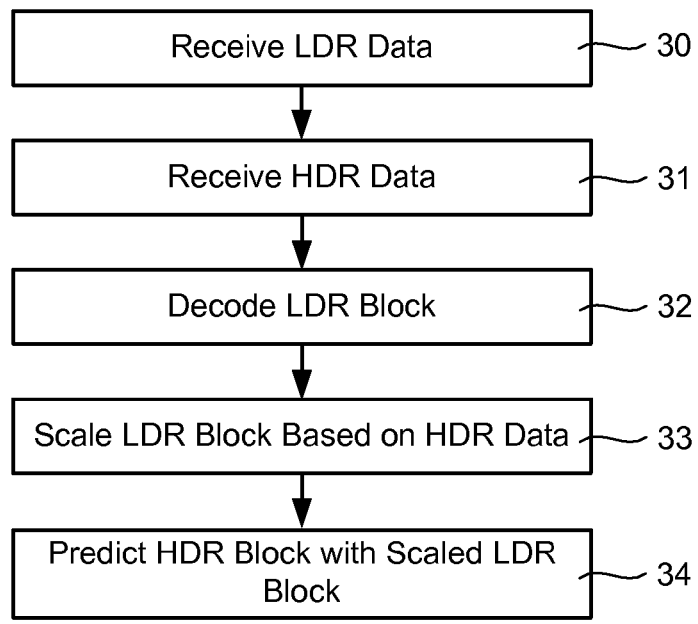
FIG. 3 is a chart showing an exemplary embodiment of the present invention comprising scaling an LDR image element according to HDR bitstream data.

Some embodiments of the present invention may be described with reference to FIG. 3. In these embodiments, LDR/base-layer image data may be received 30 and corresponding HDR/enhancement-layer data also may be received 31. An LDR/base-layer block, or other image element, then may be decoded 32 from the LDR/base-layer data. The decoded LDR/base-layer image element then may be scaled 33. This scaling may be performed according to data embedded in the HDR/enhancement-layer data. Scaling of individual image elements may be related to, or a function of, image characteristics comprising spatial location, luminance data, chrominance data and other data. The scaled, decoded LDR/base-layer image may then be used to predict 34 a corresponding HDR block or other image element. In some embodiments, the scaled, decoded LDR/base-layer image element may be added to a corresponding decoded residual image element to form an HDR/enhancement-layer image element.

Figure 4:
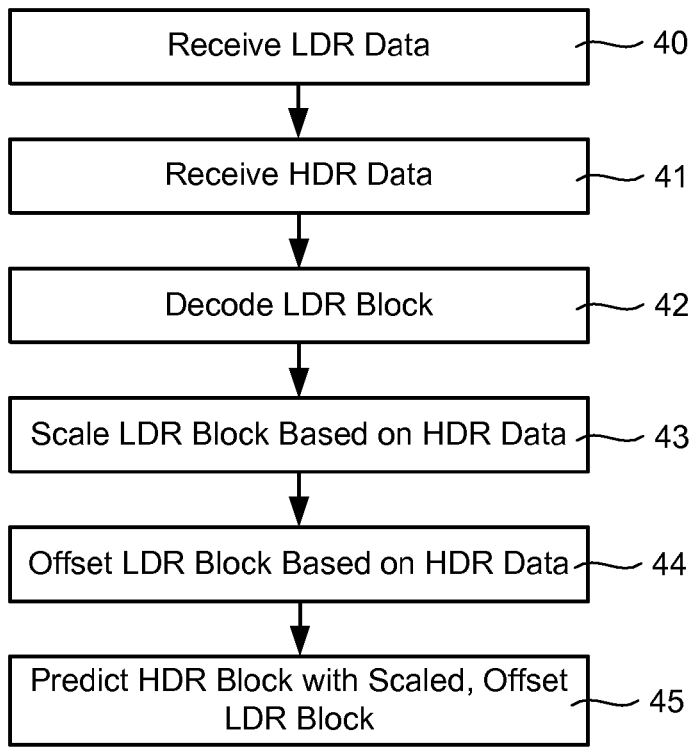
FIG. 4 is a chart showing an exemplary embodiment of the present invention comprising scaling and applying an offset to an LDR image element according to HDR bitstream data.

Some embodiments of the present invention may be described with reference to FIG. 4. In these embodiments, LDR/base-layer image data may be received 40 and corresponding HDR/enhancement-layer data also may be received 41. An LDR/base-layer block, or other image element, then may be decoded 42 from the LDR/base-layer image data. The decoded LDR/base-layer image element may be then scaled 43. This scaling may be performed according to data embedded in the HDR/enhancement-layer data. Scaling of individual image elements may be related to or a function of image characteristics comprising spatial location, luminance data, chrominance data and other data. An offset may then be added 44 to the scaled LDR image element. Offset data may be carried in the corresponding HDR/enhancement-layer data. Offset data may vary between image elements and may be dependent on image characteristics comprising spatial location, luminance data, chrominance data and other data.

The scaled, offset and decoded LDR/base-layer image may then be used to predict 45 a corresponding HDR block or other image element. In some embodiments, the scaled, offset and decoded LDR/base-layer image element may be added to a corresponding decoded residual image element to form an HDR/enhancement-layer image element.

Figure 5:
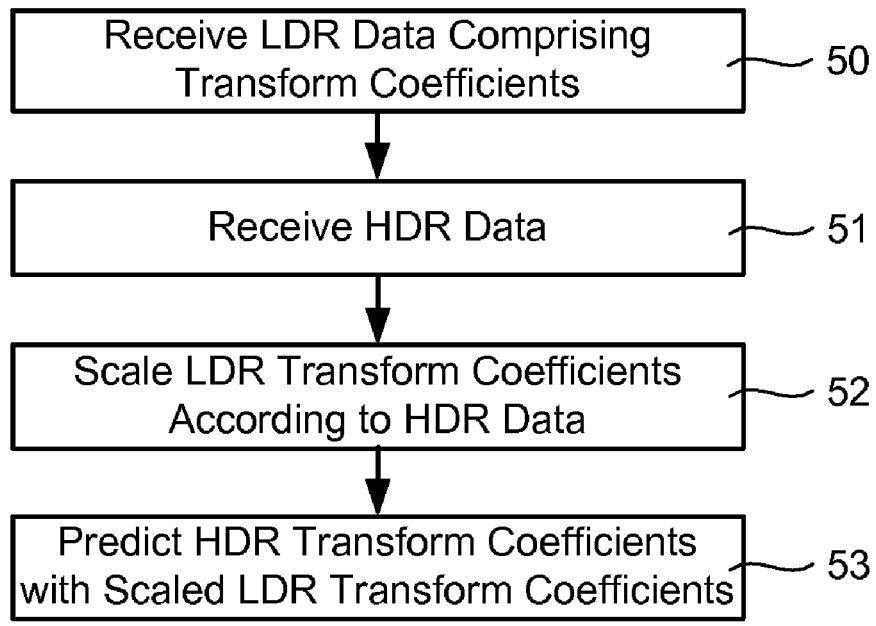
FIG. 5 is a chart showing an exemplary embodiment of the present invention comprising scaling LDR transform coefficients for HDR prediction.

Some embodiments of the present invention may be described with reference to FIG. 5. In these embodiments, an LDR/base-layer image comprising LDR transform coefficients may be received 50, and corresponding HDR/enhancement-layer data also may be received 51. The LDR/base-layer image transform coefficients may then be scaled 52. This scaling may be performed according to data embedded in the HDR/enhancement-layer data. Scaling of LDR transform coefficients may be related to or a function of image characteristics comprising spatial location, luminance data, chrominance data and other data. The scaled LDR/base-layer transform coefficients may then be used to predict 53 transform coefficients for a corresponding HDR block or other image element.

Figure 6:
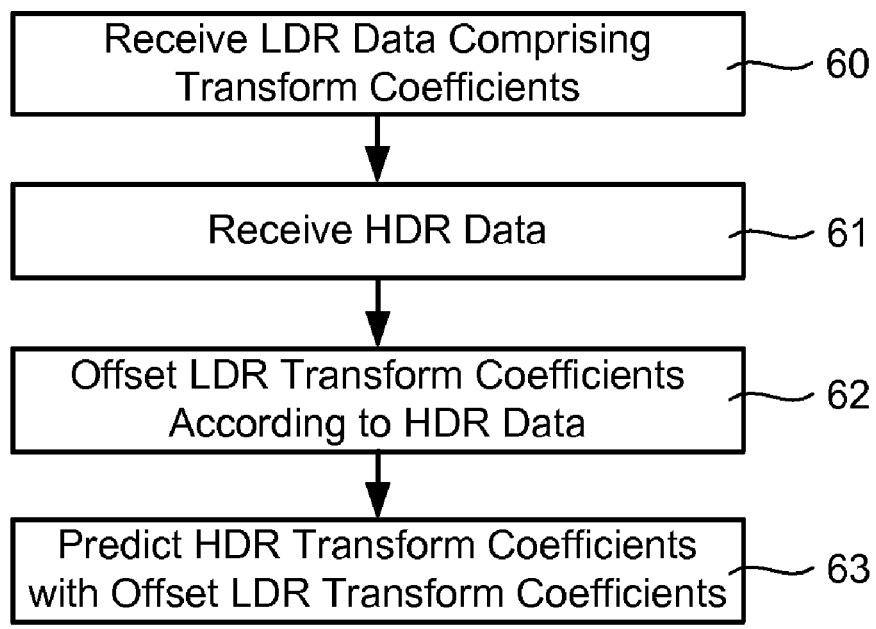
FIG. 6 is a chart showing an exemplary embodiment of the present invention comprising applying an offset to LDR transform coefficients for HDR prediction.

Some embodiments of the present invention may be described with reference to FIG. 6. In these embodiments, an LDR/base-layer image comprising LDR transform coefficients may be received 60, and corresponding HDR/enhancement-layer data also may be received 61. The LDR/base-layer image transform coefficients may then be offset 62. Offset data may be carried in the corresponding HDR/enhancement-layer data 61. Offset data may vary between image elements and may be dependent on image characteristics comprising spatial location, luminance data, chrominance data and other data. The offset LDR/base-layer transform coefficients may then be used to predict 63 transform coefficients for a corresponding HDR block or other image element.

Figure 7:
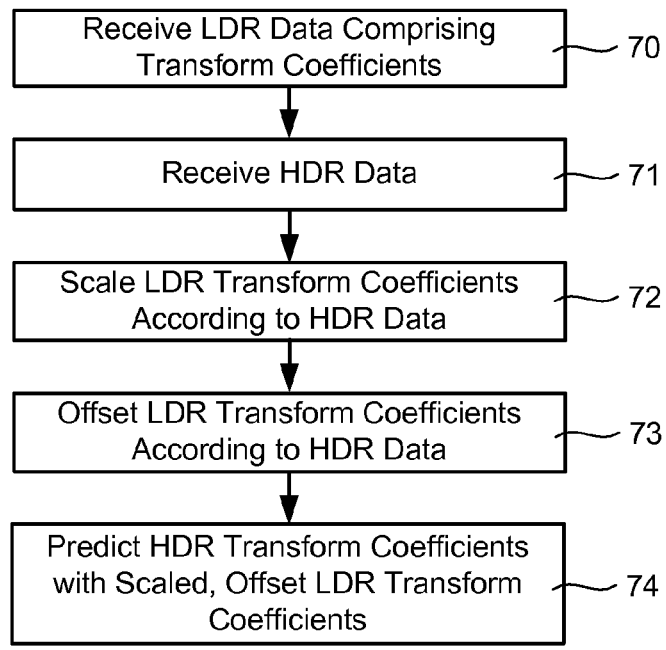
FIG. 7 is a chart showing an exemplary embodiment of the present invention comprising scaling LDR transform coefficients and applying an offset to LDR transform coefficients for HDR prediction.

Some embodiments of the present invention may be described with reference to FIG. 7. In these embodiments, an LDR/base-layer image comprising LDR transform coefficients may be received 70, and corresponding HDR/enhancement-layer data also may be received 71. The LDR/base-layer image transform coefficients may then be scaled 72. This scaling may be performed according to data embedded in the HDR/enhancement-layer data. Scaling of LDR transform coefficients may be related to or a function of image characteristics comprising spatial location, luminance data, chrominance data and other data. The scaled LDR/base-layer image transform coefficients may then be offset 73. Offset data may be carried in the corresponding HDR/enhancement-layer data 71. Offset data may vary between image elements and may be dependent on image characteristics comprising spatial location, luminance data, chrominance data and other data. The scaled, offset LDR/base-layer transform coefficients may then be used to predict 74 transform coefficients for a corresponding HDR block or other image element.

Figure 8:
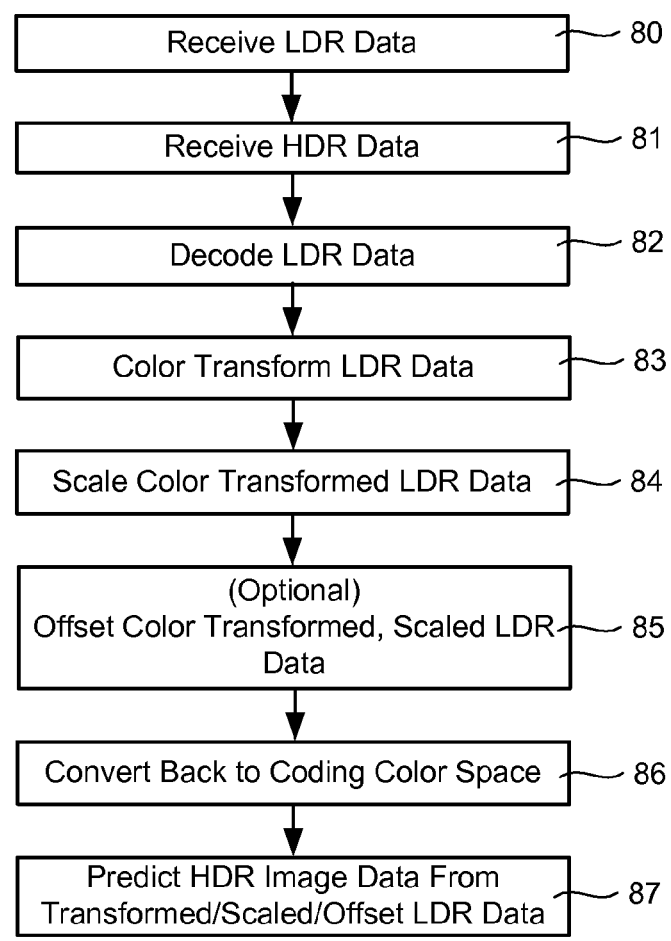
FIG. 8 is a chart showing an exemplary embodiment of the present invention comprising scaling and applying an offset to color-transformed image elements for HDR prediction.

Some embodiments of the present invention may be described with reference to FIG. 8. In these embodiments, LDR/base-layer image data may be received 80, and corresponding HDR/enhancement-layer data also may be received 81. An LDR/base-layer block, or image element, may then be decoded 82 from the LDR/base layer image data. The decoded LDR/base-layer image element may then be converted 83 or transformed to an alternative color format or color space. While in this alternative color space, the LDR image element may be scaled 84. This scaling may be performed according to data embedded in the HDR/enhancement-layer data. Scaling of individual image elements may be related to or a function of image characteristics comprising spatial location, luminance data, chrominance data and other data. Also, while in the alternative color space, an offset may then be added 85 to the scaled, color-converted LDR image element. Offset data may be carried in the corresponding HDR/enhancement-layer data. Offset data may vary between image elements and may be dependent on image characteristics comprising spatial location, luminance data, chrominance data and other data.

The scaled and/or offset and color-converted LDR/base-layer image may then be converted back 86 to the coding color space. This scaled and/or offset, coding-color-space LDR/base-layer image may then be used to predict 87 a corresponding HDR block or image element.

Figure 9:
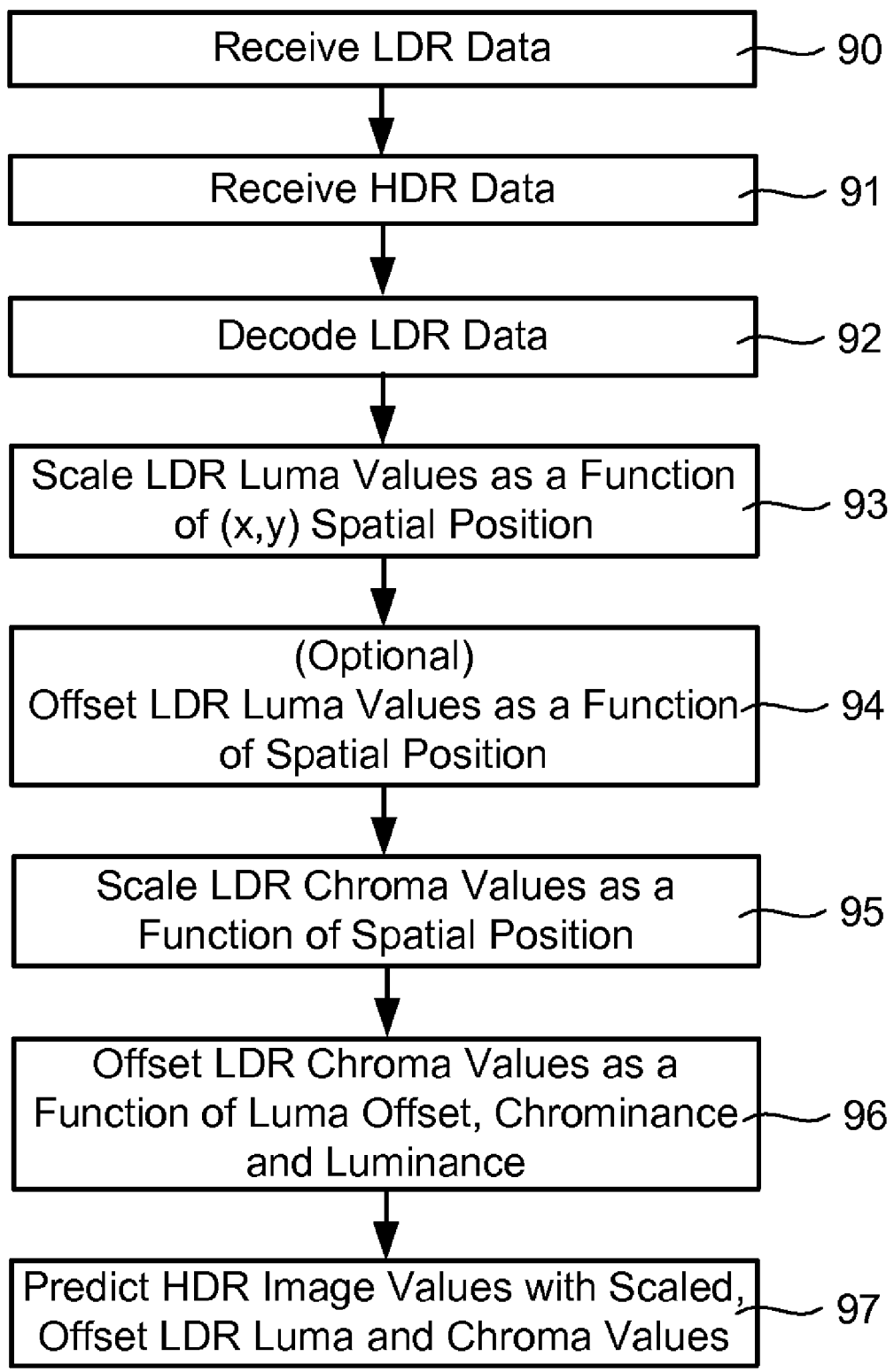
FIG. 9 is a chart showing an exemplary embodiment of the present invention comprising separate scaling and offset operations for luminance and chrominance elements.

Some embodiments of the present invention may be described with reference to FIG. 9. In these embodiments, LDR/base-layer image data may be received 90, and corresponding HDR/enhancement-layer data may be also received 91. An LDR/base-layer block, or image element, may then be decoded 92 from the LDR/base-layer image data. In these embodiments, the decoded LDR/base-layer image may comprise separable luminance and chrominance values. In some embodiments, luminance values may be scaled 93 in relation to their spatial position in the image. Other factors may also affect the luminance value scaling operation. In some embodiments, these luminance values may be offset 94. The offset operation may also be related to the spatial position of the luminance value. In some embodiments, the chrominance values of the decoded LDR/base-layer image may be scaled 95. This chrominance scaling may also be related to the spatial position of the chrominance value. In some embodiments, chrominance values may also be offset 96. The chrominance value offset may be related to a luminance offset, a chrominance value or scaling factor and/or a spatial position of the chrominance value. Other factors may also affect the chrominance offset.

Once the luminance and chrominance values are scaled and/or offset, they may be used to predict 97 a corresponding HDR/enhancement-layer image element.

In some embodiments of the present invention, the inter-layer prediction process may be controlled at a fine granularity. As a specific example, the scaling and offset factors may vary on a 4×4 block basis. That is, for every 4×4 block in the image, an encoder may signal the appropriate scaling and offset factor. Additionally, an encoder may enable and disable inter-layer prediction on a block-by-block basis. This allows, for example, the high dynamic range image to be predicted from the low dynamic range image in a portion of the frame while predicted with alternative mechanisms in other spatial regions. Specifically, intra-frame and inter-frame prediction mechanisms may be used in these other spatial regions.

Exemplary Scaling Embodiments

Some embodiments of the present invention comprise inter-layer prediction methods that are multiplication free. In these embodiments, the base-layer data may be decoded, and the decoded samples may be processed with a sequence of binary shifts and adds. In some embodiments, this may be accomplished with a process described by equation 1:

$$HDR(x, y) = \sum_{\forall i} a_i * LDR(x, y) \ll i, \quad (1)$$

where HDR and LDR are, respectively, the high dynamic range and low dynamic range version of the image sequence, x and y denote the spatial location within the image frame, and $a_i$ is a binary indicator that belongs to the set $\{-1,0,1\}$. Some embodiments may select $i=\{0,1,2,3\}$.

Alternative Exemplary Scaling Embodiments

Some inter-layer prediction embodiments comprise an offset in the inter-layer prediction process. Some embodiments may comprise a process described in equation 2:

$$HDR(x, y) = \sum_{\forall i} a_i * LDR(x, y) \ll i + \text{Offset}(x, y), \quad (2)$$

where Offset(x,y) is the offset value. In some embodiments, the offset value may be signaled with the scaling values. Alternatively, it may be signaled as part of a residual refinement process.

Spatial Adaptivity

In some embodiments, control of the prediction process may be enabled at fine granularity. For example, when the base-layer video codec employs a block-based structure, the inter-layer prediction process may vary the scaling and offset parameters on a similar block grid. In some embodiments, this may be achieved by sending scaling and/or offset information from the encoder to the decoder within an enhancement bitstream.

In some signaling embodiments, the scaling factors may be transmitted differentially. That is, the scale factor may be predicted from previously received scale factors. Then, a correction may be transmitted in the bitstream. Some embodiments may predict the scale factor from the upper- or left-most neighbor to the current block. Alternatively, some embodiments may predict the scale factor as the minimum value of the upper- or left-most neighbor.

In addition, in some embodiments, the encoder may signal the correction value as a function of the upper and left-most neighbors. For example, the encoder and decoder may use a specific context or state for signaling when the neighbors have the same scale factor. An alternative state may be used when the neighbors have different scale factors.

High-Level Syntax

Some embodiments of the present invention comprise high dynamic range video coding where the scale factor is the same throughout an image region. To accommodate these cases, high-level information may also be transmitted from the encoder to the decoder. This high-level information may disable the transmission of scaling and/or offset parameters on a block-by-block or region-by-region basis. For the case that transmission of the parameters is disabled, the high level information may comprise the scaling and/or offset information to be used. In some embodiments, this high-level signaling may occur on a macroblock, slice, picture or sequence basis.

Transform Domain Processing

In some embodiments of the present invention, the inter-layer prediction process operates on intensity data. That is, the information may be decoded and converted to the spatial domain by reversing any transform used for signaling. In alternative prediction embodiments, the scaling and offset operations may be directly applied in the transform domain. In these embodiments, the transform coefficients may be de-quantized and then scaled by scale factors. In some embodiments, transform coefficients may be processed differently depending on their frequency characteristics. For example, in some embodiments, the scaling operation may be applied solely to the AC coefficients while the offset operation may affect the DC component. In some embodiments, different scaling and offset operations may be signaled for different coefficients or coefficient types.

Some embodiments of the present invention may comprise a video codec that may adaptively switch between transform domain and spatial domain prediction mechanisms. In some embodiments, this switch may be signaled on a sequence, frame or slice basis. In some embodiments, this switch may operate at finer granularity, such as a block or macro-block.

Color and Color Space Issues

An issue in scalable, high dynamic range video coding is the management of color. In some embodiments of the present invention, a color transform may be used prior to inter-layer prediction. This may address the fact that most color spaces used for video coding are not iso-luminant. For example, a video codec typically transmits data in the YCbCr color space with code-word mappings defined in International Telecommunication Union, "Parameter Values for the HDTV Standards for Production and International Programme Exchange," ITU-R BT.709-5, April, 2002.

Some embodiments of the present invention may perform an inter-layer prediction process in a color space closely related to the coding color space. In some exemplary embodiments, the color transform may be expressed in the following equations:

$$Y_{LDR} = Y_{LDR},$$

$$b = \frac{Cb_{LDR}}{Y_{LDR} + Cr_{LDR} + Cb_{LDR}},$$

$$y = \frac{Y_{LDR}}{Y_{LDR} + Cr_{LDR} + Cb_{LDR}},$$

where $Y_{LDR}$, $Cb_{LDR}$ and $Cr_{LDR}$ are the luma and chroma components in the low dynamic range image sequence, respectively. Then, the scaling and offset process may be applied to $Y_{LDR}$ to generate $Y_{HDR}$. Finally, the inter-predicted region may be computed with the following equations:

$$Y_{HDR} = Y_{HDR},$$

$$Cb_{HDR} = \frac{bY_{HDR}}{y},$$

$$Cr_{HDR} = \frac{(1-b-y)Y_{HDR}}{y},$$

where $Cb_{HDR}$ and $Cr_{HDR}$ are predictions for the color components in the high dynamic range layer.

In some embodiments wherein $Y_{LDR}$, $Cb_{LDR}$ and $Cr_{LDR}$ may not be represented at the same resolution, the components may be resampled. In some exemplary embodiments, applications may down-sample the luma component when the chroma components are stored at a lower resolution. Alternatively, the chroma components may be up-sampled to match the resolution of the luma component.

Alternative Color and Color Space Issues

In some embodiments of the present invention, inter-layer prediction may operate directly on the decoded data without employing a color transform. In some exemplary embodiments, the prediction process may be expressed by the following equations:

$$Y_{HDR}(x,y)=\text{Scale}(x,y,c)*Y_{LDR}(x,y)+\text{Offset}(x,y,c),$$

$$Cb_{HDR}(x,y)=\text{Scale}(x,y,c)*Cb_{LDR}(x,y)+\text{Offset}(x,y,c),$$

$$Cr_{HDR}(x,y)=\text{Scale}(x,y,c)*Cr_{LDR}(x,y)+\text{Offset}(x,y,c),$$

where the scaling and offset parameters may now be a function of both spatial location and chroma component. That is, the reconstructed luma and chroma values may be scaled with different scale factors.

In some exemplary inter-prediction processes, the luma and chroma values may be scaled with the same scale factor but with different offsets. This may be expressed with the following equations:

$$Y_{HDR}(x,y)=\text{Scale}(x,y)*Y_{LDR}(x,y)+\text{Offset}(x,y,c),$$

$$Cb_{HDR}(x,y)=\text{Scale}(x,y)*Cb_{LDR}(x,y)+\text{Offset}(x,y,c),$$

$$Cr_{HDR}(x,y)=\text{Scale}(x,y)*Cr_{LDR}(x,y)+\text{Offset}(x,y,c).$$

In these embodiments, the scale factor may not depend on the chroma component. In some embodiments, the encoder may transmit the offsets within the enhancement-layer bitstream.

In other exemplary embodiments of the inter-prediction process, the luma and chroma values may be scaled with the same scale factor, and the offset for the chroma values may be dependent on the offset of the luma values as well as the decoded image data. This relationship may be expressed in the following equations:

$$Y_{HDR}(x,y)=\text{Scale}(x,y)*Y_{LDR}(x,y)+\text{Offset}(x,y),$$

$$Cb_{HDR}(x,y)=\text{Scale}(x,y)*Cb_{LDR}(x,y)+f(\text{Offset}(x,y), Cb_{LDR}(x,y), Y_{LDR}(x,y)),$$

$$Cr_{HDR}(x,y)=\text{Scale}(x,y)*Cr_{LDR}(x,y)+f(\text{Offset}(x,y), Cr_{LDR}(x,y), Y_{LDR}(x,y)),$$

where $f(\cdot,\cdot,\cdot)$ denotes a mapping operation.

An exemplary mapping operation may be expressed as:

$$f(\text{Offset}(x,y), A_{LDR}(x,y), Y_{LDR}(x,y)) = \text{Offset}(x,y)\frac{A_{LDR}(x,y)}{Y_{LDR}(x,y)},$$

where $A_{LDR}(x,y)$ denotes an arbitrary color component, such as Cb or Cr.

In some embodiments, the chroma and luma components may be represented on different sampling grids. In some of these embodiments, the chroma and luma data may be resampled to the same resolution. In some embodiments, a different mapping process may be employed. In some exemplary embodiments, the mapping relationship may be expressed as:

$$f(\text{Offset}(x,y), A_{LDR}(x,y), Y_{LDR}(x,y)) = \text{Offset}(x,y)\frac{Avg(A_{LDR}(x,y))}{Avg(Y_{LDR}(x,y))},$$

where $Avg(\cdot)$ denotes the mean operator. In another exemplary embodiment, the mean may be replaced with a summation operation. In other embodiments, non-linear operations such as the median, min and max operations may be beneficial.

In some exemplary embodiments, the mean operator (or an alternative operator) may be performed in a different domain than that of the Offset variable. In some exemplary embodiments, the mean operation may be computed in the transform domain by operating solely on the DC coefficient. Similarly, in embodiments wherein the spatial resolutions of the chroma and luma coefficients are not matched, the mean operation may be computed by analyzing multiple DC coefficients in the luma base layer.

High Dynamic Range Prediction Parameter Determination

Some embodiments of the present invention may comprise elements for determining a predicted value for a high dynamic range (HDR) prediction parameter. Some embodiments of the present invention may comprise elements for refining a predicted HDR prediction parameter value. Exemplary HDR prediction parameters include scale parameters, offset parameters and other parameters which may be used in predicting HDR image data from low dynamic range (LDR) image data. While the embodiments described in this section may be described in relation to scale parameters and offset parameters, it will be understood by one of ordinary skill in the art, that the methods and systems embodied in these descriptions may be used for determining other HDR prediction parameter values. These descriptions are by way of illustration and not limitation.

Figure 10:
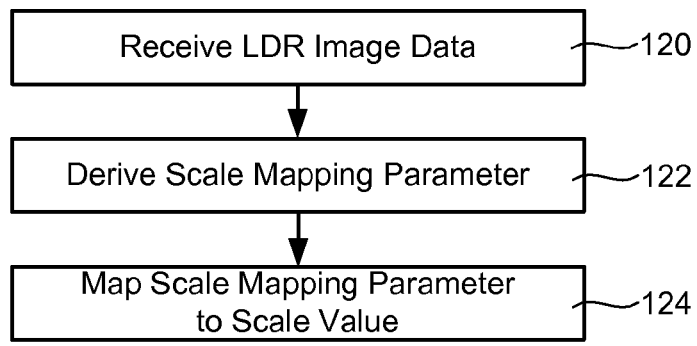
FIG. 10 is a chart showing an exemplary embodiment of the present invention comprising using a scale mapping parameter to predict a scale parameter value.

In some embodiments of the present invention, a scale parameter may be derived by analyzing decoded, low dynamic range (LDR) image data to determine a predicted scale parameter. Some of these embodiments may be described in relation to FIG. 10. LDR image data may be received 120, and a scale mapping parameter may be derived 122 from the LDR image data. The scale mapping parameter may be mapped 124 to a scale parameter prediction. In some embodiments, the mapping 124 may comprise using the scale mapping parameter as an index into a look-up-table of candidate scale parameter values. In some of these embodiments of the present invention, the look-up-table of candidate scale parameter values may be signaled to a decoder within the bitstream, may be stored as a default look-up-table at the decoder or may otherwise be signaled to the decoder. In alternative embodiments, the scale mapping parameter may be used in a scale-parameter generating function. In some of these embodiments of the present invention, the scale-parameter generating function may be signaled to a decoder within the bitstream, may be stored as a default generating function at the decoder or may otherwise be signaled to the decoder.

In some embodiments of the present invention, the scale parameter may comprise a luminance scale parameter and a chrominance scale parameter. In some of these embodiments, the scale mapping parameter may index a luminance-scale-parameter look-up-table to determine a predicted luminance scale parameter, and the scale mapping parameter may index a chrominance-scale-parameter look-up-table to determine a predicted chrominance scale parameter. In alternative embodiments, two scale mapping parameters may be generated: a luminance scale mapping parameter and a chrominance scale mapping parameter. In some of these embodiments, the two different mapping parameters may index into the same look-up-table. In alternative embodiments, the luminance scale mapping parameter and the chrominance scale mapping parameter may index into a luminance-scale-parameter look-up-table and a chrominance-scale-parameter look-up-table, respectively.

In alternative embodiments of the present invention, wherein the scale parameter may comprise a luminance scale parameter and a chrominance scale parameter, the scale mapping parameter may be used in a luminance-scale-parameter generating function to generate a predicted luminance scale parameter. The scale mapping parameter may also be used in a chrominance-scale-parameter generating function to generated a predicted chrominance scale parameter. In still alternative embodiments of the present invention, wherein the scale parameter may comprise a luminance scale parameter and a chrominance scale parameter, two scale mapping parameters may be generated: a luminance scale mapping parameter and a chrominance scale mapping parameter. In some of these alternative embodiments, the two different mapping parameters may be used in the same scale-parameter generating function to generate two scale parameters: a predicted luminance scale parameter and a predicted chrominance scale parameter. In yet alternative embodiments, the luminance scale mapping parameter may be used in a luminance-scale-parameter generating function to generate a predicted luminance scale parameter, and the chrominance scale mapping parameter may be used in a chrominance-scale-parameter generated function to generate a predicted chrominance scale parameter.

Figure 11:
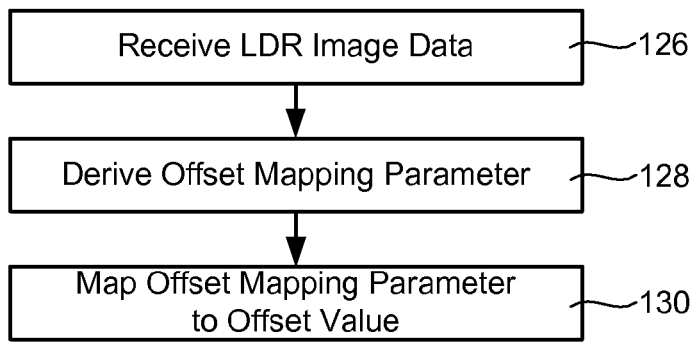
FIG. 11 is a chart showing an exemplary embodiment of the present invention comprising using an offset mapping parameter to predict an offset parameter value.

In some embodiments of the present invention, an offset parameter may be derived by analyzing decoded, low dynamic range (LDR) image data to determine a predicted offset parameter. These embodiments may be described in relation to FIG. 11. LDR image data may be received 126, and an offset mapping parameter may be derived 128 from the LDR image data. The offset mapping parameter may be mapped 130 to an offset parameter prediction. In some embodiments, the mapping 130 may comprise using the offset mapping parameter as an index into a look-up-table of candidate offset parameter values. In some of these embodiments of the present invention, the look-up-table of candidate offset parameter values may be signaled to a decoder within the bitstream, may be stored as a default look-up-table at the decoder or may otherwise be signaled to the decoder. In alternative embodiments, the offset mapping parameter may be used in an offset-parameter generating function. In some of these embodiments of the present invention, the offset-parameter generating function may be signaled to a decoder within the bitstream, may be stored as a default generating function at the decoder or may otherwise be signaled to the decoder.

In some embodiments of the present invention, the offset parameter may comprise a luminance offset parameter and a chrominance offset parameter. In some of these embodiments, the offset mapping parameter may index a luminance-offset-parameter look-up-table to determine a predicted luminance offset parameter, and the offset mapping parameter may index a chrominance-offset-parameter look-up-table to determine a predicted chrominance offset parameter. In alternative embodiments, two offset mapping parameters may be generated: a luminance offset mapping parameter and a chrominance offset mapping parameter. In some of these embodiments, the two different mapping parameters may index into the same look-up-table. In alternative embodiments, the luminance offset mapping parameter and the chrominance offset mapping parameter may index into a luminance-offset-parameter look-up-table and a chrominance-offset-parameter look-up-table, respectively.

In alternative embodiments of the present invention, wherein the offset parameter may comprise a luminance offset parameter and a chrominance offset parameter, the offset mapping parameter may be used in a luminance-offset-parameter generating function to generate a predicted luminance offset parameter. The offset mapping parameter may also be used in a chrominance-offset-parameter generating function to generated a predicted chrominance offset parameter. In still alternative embodiments of the present invention, wherein the offset parameter may comprise a luminance offset parameter and a chrominance offset parameter, two offset mapping parameters may be generated: a luminance offset mapping parameter and a chrominance offset mapping parameter. In some of these alternative embodiments, the two different mapping parameters may be used in the same offset parameter generating function to generate two offset parameters: a predicted luminance offset parameter and a predicted chrominance offset parameter. In yet alternative embodiments, the luminance offset mapping parameter may be used in a luminance-offset-parameter generating function to generate a predicted luminance offset parameter, and the chrominance offset mapping parameter may be used in a chrominance-offset-parameter generated function to generate a predicted chrominance offset parameter.

Figure 12:
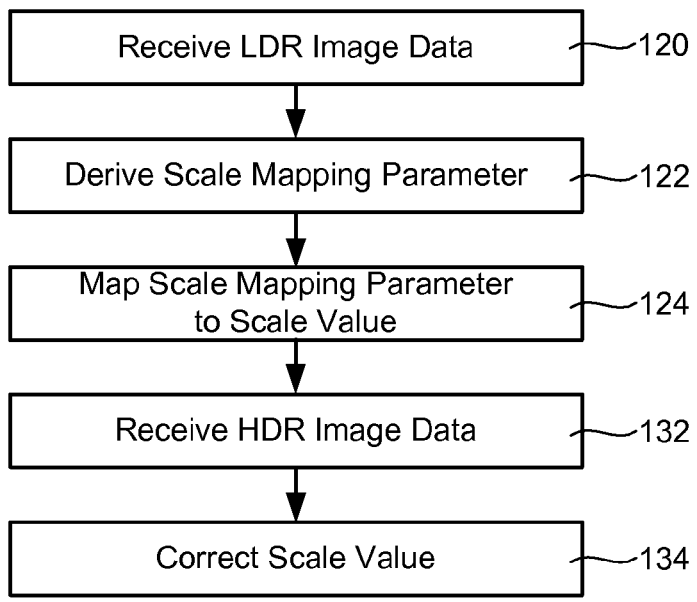
FIG. 12 is a chart showing an exemplary embodiment of the present invention comprising correcting a predicted scale parameter value in accordance with a residual value received as part of the HDR enhancement-layer bitstream.

Some embodiments of the present invention may be described in relation to FIG. 12. In these embodiments, a scale parameter may be derived by analyzing decoded, low dynamic range (LDR) image data to determine a predicted scale parameter which may then be corrected according to enhancement data. LDR image data may be received 120, and a scale mapping parameter may be derived 122 from the LDR image data. The scale mapping parameter may be mapped 124 to a scale parameter prediction. Correction data may be received 132 as part of high dynamic range (HDR) image data. The predicted scale parameter value determined 124 from the scale mapping parameter may be corrected 134, also considered refined, in accordance with the HDR image data. In some embodiments wherein the scale parameter may comprise a luminance scale parameter and a chrominance scale parameter, the correction data may comprise a single correction which may be applied to both the predicted luminance scale parameter and the predicted chrominance scale parameter. In alternative embodiments wherein the scale parameter may comprise a luminance scale parameter and a chrominance scale parameter, the correction data may comprise a luminance correction which may be applied to the predicted luminance scale parameter and a chrominance correction which may be applied to the chrominance scale parameter.

Figure 13:
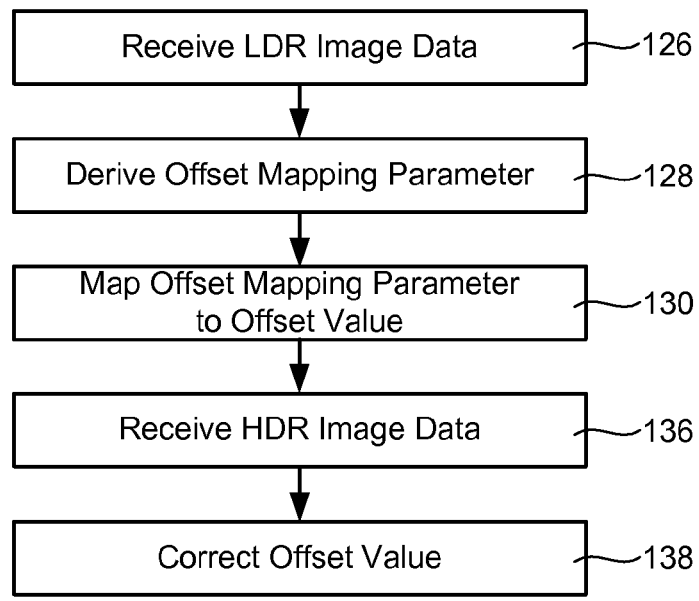
FIG. 13 is a chart showing an exemplary embodiment of the present invention comprising correcting a predicted offset parameter value in accordance with a residual value received as part of an HDR enhancement-layer bitstream.

Some embodiments of the present invention may be described in relation to FIG. 13. In these embodiments, an offset parameter may be derived by analyzing decoded, low dynamic range (LDR) image data to determine a predicted offset parameter which may then be corrected according to enhancement data. LDR image data may be received 126, and an offset mapping parameter may be derived 128 from the LDR image data. The offset mapping parameter may be mapped 130 to an offset parameter prediction. Correction data may be received 136 as part of high dynamic range (HDR) image data. The predicted offset parameter value determined 130 from the offset mapping parameter may be corrected 138, also considered refined, in accordance with the HDR image data. In some embodiments wherein the offset parameter may comprise a luminance offset parameter and a chrominance offset parameter, the correction data may comprise a single correction which may be applied to both the predicted luminance offset parameter and the predicted chrominance offset parameter. In alternative embodiments wherein the offset parameter may comprise a luminance offset parameter and a chrominance offset parameter, the correction data may comprise a luminance correction which may be applied to the predicted luminance offset parameter and a chrominance correction which may be applied to the chrominance offset parameter.

In some embodiments of the present invention, both a scale parameter and a offset parameter may be determined.

The following description of methods and system for determining a mapping parameter may apply to either a scale mapping parameter or an offset mapping parameter. In the description, the term scale/offset mapping parameter is to be understood to denote a scale mapping parameter, an offset mapping parameter and a parameter which may be used as both a scale and offset mapping parameter.

In some embodiments of the present invention, a scale/offset mapping parameter may be determined from LDR image data. In some embodiments, a scale/offset mapping parameter may be determined for a block of LDR image data. In some of these embodiments, the LDR image data within the block may be used to determine the scale/offset mapping parameter. In alternative embodiments, select image data within the block may be used to determine the scale/offset mapping parameter. In still alternative embodiments, image data outside of the block may be used to determine the scale/offset mapping parameter. The LDR data in the region of LDR image data used to determine the scale/offset mapping parameter may be referred to as the LDR parameter data. In some embodiments, the LDR parameter data may comprise color components. In some of these embodiments, the color components may comprise a luminance component and a chrominance component. In some embodiments of the present invention, the region size or region shape of LDR image data used as LDR parameter data may vary based on spatial location.

In some embodiments of the present invention, the scale/offset mapping parameter may be determined by computing a single value from the LDR parameter data. Exemplary values which may computed from the LDR parameter data may be the average of the LDR parameter data, the mean of the LDR parameter data, the summation of the LDR parameter data, the weighted average of the LDR parameter data, the weighted mean of the LDR parameter data, the weighted summation of the LDR parameter data, the median of the LDR parameter data and other computations using the LDR parameter data. In alternative embodiments, the scale/offset mapping parameter may determined by transforming the LDR parameter data. In some of these alternative embodiments, the scale/offset mapping parameter may be related to one of the transform coefficients. In other of these alternative embodiments, the scale/offset mapping parameter may be related to a subset of the transform coefficients.

The following description of methods and system for mapping a mapping parameter to a predicted value may apply to either a scale mapping parameter and a predicted scale value or an offset mapping parameter and a predicted offset value. In the description, the terms mapping parameter and predicted value is to be understood to denote either a scale mapping parameter and a predicted scale value or an offset mapping parameter and a predicted offset value.

In some embodiments of the present invention, a mapping parameter may be used as an index into a look-up-table of candidate values to determine a predicted value. In alternative embodiments, a mapping parameter may be used in a predicted value generating function to generate the predicted value. In yet alternative embodiments of the present invention, a first mapping parameter may be used as an index into a first look-up-table wherein entries in the first look-up-table correspond to a candidate-value look-up-table, and a second mapping parameter may be used as an index into the candidate-value look-up-table identified by the first mapping parameter. In still alternative embodiments, a first mapping parameter may be used as an index into a look-up-table of generating functions, and a second mapping parameter may be used in the indexed generating function to generated the predicted value.

In some embodiments of the present invention, a scale value and/or an offset value may be determined according to different mappings for different spatial regions of LDR image data.

In some embodiments of the present invention, the method for mapping the mapping parameter to the predicted value may signaled from an encoder to a decoder. In some embodiments, a mapping, for example, a look-up-table or generating function, may be signaled from the encoder to the decoder. In some embodiments, the mapping may be signaled on a slice-by-slice, picture-by-picture, sequence-by-sequence or other basis. In alternative embodiments, a plurality of mappings may be pre-stored at the decoder, and an indicator selecting one of the pre-stored mappings may be explicitly signaled from the encoder to the decoder on a slice-by-slice, picture-by-picture, sequence-by-sequence or other basis. In yet alternative embodiments of the present invention, the mapping may be signaled according to the methods and systems described in U.S. patent application Ser. No. 11/566,657, filed on Dec. 4, 2006, which is hereby incorporated herein by reference.

In some embodiments of the present invention, wherein the size of the region of LDR image data used for the LDR parameter data is not constant over an image frame, the mapping between the mapping parameter and the prediction value may be different depending on the size of the region of LDR image data used for the LDR parameter data. In alternative embodiments, wherein the size of the region of LDR image data used for the LDR parameter data is not constant over an image frame, the mapping between the mapping parameter and the prediction value may be the same for different region sizes, and a normalization factor may be applied to the predicted value based on the region size. In some embodiments, the region size may be signaled explicitly in the enhancement-layer bitstream. In alternative embodiments, the region size may be derived from other information in either the base layer or the enhancement layer. Exemplary derivations may be based on the transform size or the prediction mode determined from the bitstream.

Figure 14:
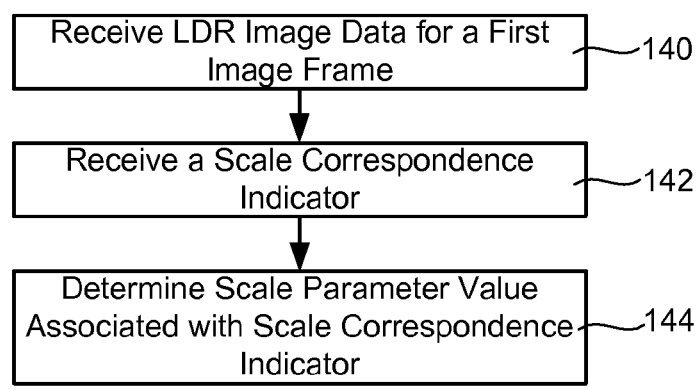
FIG. 14 is a chart showing an exemplary embodiment of the present invention comprising a scale correspondence indicator for predicting a scale parameter value.

In some embodiments of the present invention, a scale parameter value in a current image frame of an image sequence may be predicted from the scale parameter values corresponding to previously transmitted image frames. Some of these embodiments of the present invention may be described in relation to FIG. 14. In these embodiments, LDR image data for a current image frame may be received 140. A scale correspondence indicator may be received 142, and the scale correspondence indicator may be used to determine 144 a prediction of the current scale parameter value. The scale correspondence indicator may relate the current scale parameter value to a corresponding scale parameter value from a previously transmitted image frame.

Figure 15:
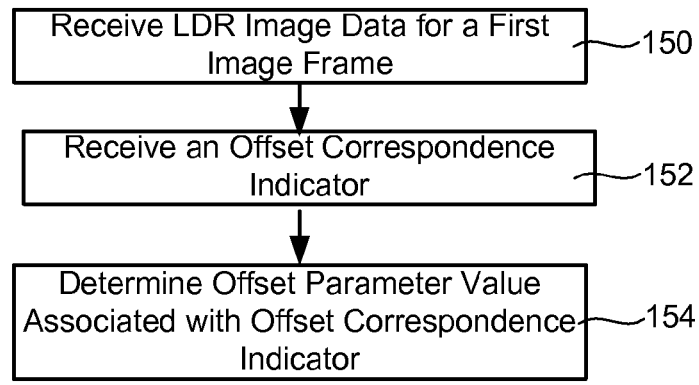
FIG. 15 is a chart showing an exemplary embodiment of the present invention comprising an offset correspondence indicator for predicting an offset parameter value.

In some embodiments of the present invention, an offset parameter value in a current image frame of an image sequence may be predicted from the offset parameter values corresponding to previously transmitted image frames. Some of these embodiments of the present invention may be described in relation to FIG. 15. In these embodiments, LDR image data for a current image frame may be received 150. An offset correspondence indicator may be received 152, and the offset correspondence indicator may be used to determine 154 a prediction of the current offset parameter value. The offset correspondence indicator may relate the current offset parameter value to a corresponding offset parameter value from a previously transmitted image frame.

Figure 16:
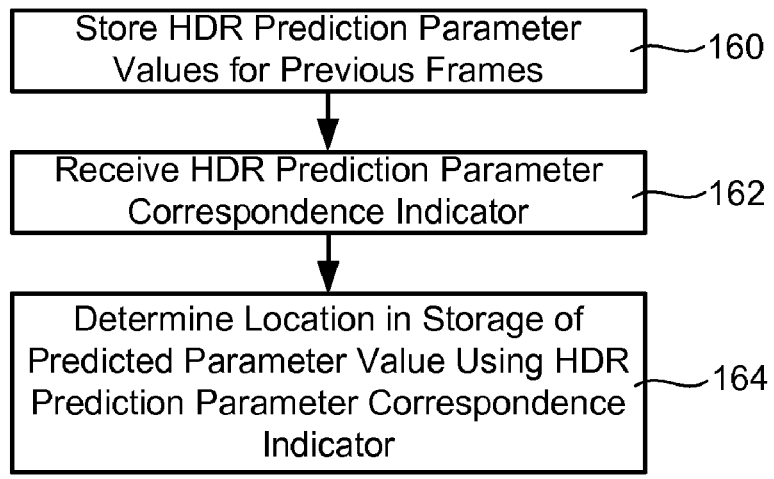
FIG. 16 is a chart showing an exemplary embodiment of the present invention comprising using an HDR prediction parameter correspondence indicator to index stored HDR prediction parameter values from previous image frames to predict a current HDR prediction parameter value.

In some embodiments of the present invention described in relation to FIG. 16, HDR prediction parameter values may be stored 160 for each previously decoded image frame. Exemplary HDR prediction parameters include offset parameters, scale parameters and other parameters which may be used in predicting HDR image data from LDR image data. In alternative embodiments, the HDR prediction parameter values may be stored for a subset of previously decoded image frames. An HDR prediction parameter correspondence indicator may be received 162. In some embodiments, the HDR prediction parameter correspondence indicator may be decoded from an enhancement-layer bitstream. The HDR prediction parameter correspondence indicator may determine 164 the location in the stored parameter values of the value which may be used as the current predicted HDR prediction parameter value.

In an exemplary embodiment, a parameter buffer may contain the parameter values for each 4-by-4 block in the previously reconstructed image frame. In this exemplary embodiment, the enhancement-layer bitstream may signal two indices which define the location in the parameter buffer of previous parameter values to use for the parameter prediction. The two indices may be signaled explicitly in some embodiments. In alternative embodiments, the indices may be signaled relative to the location of the current block in the current frame.

Some embodiments of the present invention may be described in relation to FIG. 17. In these embodiments, a predicted HDR prediction parameter value may be refined according to residual information which may be received in and HDR enhancement-layer bitstream. HDR prediction parameter values may be stored 160 for each previously decoded image frame. Exemplary HDR prediction parameters include offset parameters, scale parameters and other parameters which may be used in predicting HDR image data from LDR image data. In alternative embodiments, the HDR prediction parameter values may be stored for a subset of previously decoded image frames. An HDR prediction parameter correspondence indicator may be received 162. In some embodiments, the HDR prediction parameter correspondence indicator may be decoded from an enhancement-layer bitstream. The HDR prediction parameter correspondence indicator may determine 164 the location in the stored parameter values of the value which may be used as the current predicted HDR prediction parameter value after extracting 166 the parameter value from storage. An HDR prediction parameter residual may received 168. In some embodiments the HDR prediction parameter residual may be decoded from an enhancement-layer bitstream. The predicted HDR prediction parameter value may be corrected 170 according to the HDR prediction parameter residual.

In alternative embodiments of the present invention wherein an HDR prediction parameter value in a current image frame of an image sequence may be predicted from the HDR prediction parameter values corresponding to previously transmitted image frames, knowledge of the correspondence between pixel values in the LDR representation of the current, decoded frame and previous, decoded image data may be used to determine the predicted HDR prediction parameter value. In some embodiments of the present invention, the correspondence may be determined from parameters transmitted as part of the LDR bitstream, for example, motion vectors. In alternative embodiments, the correspondence may be determined by comparison of the LDR pixel data for the current frame and a previous LDR image frame. In some of these alternative embodiments, a motion estimation technique may be used to determine the correspondence.

In an exemplary embodiment, the correspondence between pixels in a current block and a block in a previously decoded image frame may be described with a motion vector comprising two indices. In some embodiments, the two indices may correspond to a vertical displacement and a horizontal displacement. In some embodiments, the motion vector may be used explicitly for predicting the HDR prediction parameter value. In these embodiments, the predicted HDR prediction parameter value at a pixel may be the HDR prediction parameter value of the corresponding pixel in the previous frame. In these embodiments, a different predicted HDR prediction parameter value may be obtained at each pixel in a block being decoded.

In alternative embodiments wherein a motion vector correspondence may be determined between pixels in the current frame and pixels in a previous frame, a single predicted HDR prediction parameter value may be determined based on the corresponding HDR prediction parameter values in the previous frame. Exemplary methods for combining the multiple parameter values may comprise a median computation, a mean computation, an average computation, a weighted mean computation, a weighted average computation, a voting calculation wherein the largest number of referenced parameter values in the previous locations may be used as the prediction and other combinations of the multiple parameter values.

In some embodiments of the present invention described in relation to FIG. 18, motion vector correspondence may be refined based on residual information decoded from an enhancement-layer bitstream. In these embodiments, LDR image data may be received 180, and HDR image data may be received 182. Motion vector correspondence may be determined 184. In some embodiments, motion vector correspondence may be determined 184 from parameters, for example motion vectors, transmitted with the LDR image data. In alternative embodiments, motion vector correspondence may be determined 184 through a motion vector correspondence estimation process wherein the pixel values of the LDR data may be examined. A motion vector correspondence residual value may be decoded 186 from the HDR image data. The motion vector correspondence may be corrected 188 in accordance with the motion vector correspondence residual value. The corrected motion vector correspondence may be used to determine a predicted HDR prediction parameter value.

In some embodiments of the present invention, a predicted HDR prediction parameter value may be corrected according to transmitted residual values. In these embodiments, an HDR prediction parameter value residual may be decoded from an enhancement-layer bitstream, and a predicted HDR prediction parameter value may be corrected, or refined, in accordance with the HDR prediction parameter value residual.

In some embodiments of the present invention, a first predicted HDR prediction parameter value and a second predicted HDR prediction parameter value may be determined. In some of these embodiments, the first predicted HDR prediction parameter value may be a predicted scale value, and the second predicted HDR prediction parameter value may be a predicted offset value. In some of these embodiments, a scale value residual may be determined, and an offset value may be determined. In these embodiments, the predicted scale value may be refined, and the predicted offset value may be refined. In alternative embodiments, a single residual value may be signaled, and a correction, or refinement, may be made to only one of these predicted values. The other predicted value may be adjusted based on the signaled residual value, characteristics of the decoded LDR image data and the other predicted value.

In some embodiments of the present invention, a flag may be send within the enhancement-layer bitstream from an encoder to a decoder. The flag may be sent on a block-by-block, macro-block-by-macro-block, slice-by-slice, frame-by-frame, sequence-by-sequence or other basis. The value, or state, of the flag may determine the prediction method to be used for predicting the HDR prediction parameter value. Exemplary prediction methods include those described herein.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for predicting a high dynamic range image element, said method comprising:
    receiving, in a video coder, a plurality of low dynamic range (LDR) image data;
    generating, in said video coder, a first predicted high dynamic range (HDR) prediction parameter value based on said plurality of LDR image data;
    extracting, in said video coder, an LDR image value from said plurality of LDR image data; and
    forming, in said video coder, an HDR image element prediction using said first predicted HDR prediction parameter value and said LDR image value.

2. A method as described in claim 1, wherein said first predicted HDR prediction parameter value is an HDR prediction parameter value selected from the group consisting of a predicted scale value and a predicted offset value.

3. A method as described in claim 1 further comprising:
    generating a second predicted HDR prediction parameter value based on said plurality of LDR image data; and
    forming said HDR image element prediction using said first predicted HDR prediction parameter value, said second predicted HDR prediction parameter value and said LDR image value.

4. A method as described in claim 3, wherein said first predicted HDR prediction parameter value is a predicted scale value and said second predicted HDR prediction parameter value is a predicted offset value.

5. A method as described in claim 1, wherein said first predicted HDR prediction parameter value comprises a luma HDR prediction parameter value and a chroma HDR prediction parameter value.

6. A method as described in claim 1, wherein said forming an HDR image element prediction using said first predicted HDR prediction parameter value and said LDR image value comprises:
    receiving a first HDR prediction parameter value residual; and
    adjusting said first predicted HDR prediction parameter value in accordance with said received first HDR prediction parameter value residual.

7. A method as described in claim 1 further comprising:
    receiving an HDR residual image element; and
    combining said HDR image element prediction with said HDR residual image element to form a residually-corrected HDR image element.

8. A method as described in claim 1, wherein said generating a first predicted HDR prediction parameter value based on said plurality of LDR image data comprises:
    determining a mapping parameter value based on said plurality of LDR image data; and
    selecting said first predicted HDR prediction parameter value from a plurality of candidate first HDR prediction parameter values based on said mapping parameter value.

9. A method as described in claim 8, wherein said determining a mapping parameter value based on said plurality of LDR image data comprises combining said plurality of LDR image data using a method selected from the group consisting of summation, average, mean, weighted summation, weighted average, weighted mean, normalized summation, block transform and median.

10. A method as described in claim 8, wherein said selecting said first predicted HDR prediction parameter value from a plurality of candidate first HDR prediction parameter values based on said mapping parameter value comprises using said mapping parameter value as an index into a look-up-table comprising said plurality of candidate first HDR prediction parameter values.

11. A method for predicting a high dynamic range image element, said method comprising:
    receiving, in a video coder, a low dynamic range (LDR) image data corresponding to a first image frame;
    receiving, in said video coder, a first correspondence indicator relating said LDR image data to a first previous-image-frame first high dynamic range (HDR) prediction parameter value;
    generating, in said video coder, a first predicted HDR prediction parameter value based on said first correspondence indicator;
    extracting, in said video coder, an LDR image value from said LDR image data; and
    forming, in said video coder, an HDR image element prediction using said first predicted HDR prediction parameter value and said LDR image value.

12. A method as described in claim 11, wherein said first predicted HDR prediction parameter value is an HDR prediction parameter value selected from the group consisting of a predicted scale value and a predicted offset value.

13. A method as described in claim 11 further comprising:
    receiving a second correspondence indicator relating said LDR image data to a second-previous-image frame second HDR prediction parameter value;
    generating a second predicted HDR prediction parameter value based on said second correspondence indicator; and forming said HDR image element prediction using said first predicted HDR prediction parameter value, said second predicted HDR prediction parameter value and said LDR image value.

14. A method as described in claim 13, wherein said first predicted HDR prediction parameter value is a predicted scale value and said second predicted HDR prediction parameter value is a predicted offset value.

15. A method as described in claim 11, wherein said first predicted HDR prediction parameter value comprises a luma HDR prediction parameter value and a chroma HDR prediction parameter value.

16. A method as described in claim 11, wherein said forming an HDR image element prediction using said first predicted HDR prediction parameter value and said LDR image value comprises:

receiving a first HDR prediction parameter value residual; and adjusting said first predicted HDR prediction parameter value in accordance with said received first HDR prediction parameter value residual.

17. A method as described in claim 11 further comprising:
receiving an HDR residual image element; and
combining said HDR image element prediction with said HDR residual image element to form a residually-corrected HDR image element.

18. A method as described in claim 11, wherein said first correspondence indicator indicates a location in a first HDR prediction parameter value buffer, wherein said first HDR prediction parameter value buffer comprises a plurality of first HDR prediction parameter values associated with said first previous frame.

19. A method as described in claim 11, wherein said first correspondence indicator comprises motion vector information relating said first frame to said first previous frame.

20. A method as described in claim 19 further comprising:
receiving motion vector residual information; and
correcting said motion vector information with said motion vector residual information.

21. A method as described in claim 19, wherein said motion vector information is calculated from said LDR image data corresponding to said first frame and LDR image data corresponding to said first previous frame.

* * * * *